United States Patent
Keller et al.

(10) Patent No.: US 6,308,675 B1
(45) Date of Patent: Oct. 30, 2001

(54) GAS EXCHANGE VALVE WITH A HOLLOW SPACE

(75) Inventors: Peter Keller, Schmitten; Lothar Mück, Wölfersheim, both of (DE)

(73) Assignee: Mahle Ventilrieb GmbH, Stuttgart (DE)

( * ) Notice: Subject to any disclaimer, the term of this patent is extended or adjusted under 35 U.S.C. 154(b) by 0 days.

(21) Appl. No.: 09/600,846

(22) PCT Filed: Dec. 19, 1998

(86) PCT No.: PCT/EP98/08342

§ 371 Date: Jul. 24, 2000

§ 102(e) Date: Jul. 24, 2000

(87) PCT Pub. No.: WO99/38644

PCT Pub. Date: Aug. 5, 1999

(30) Foreign Application Priority Data

Jan. 29, 1998 (DE) .............................................. 198 03 294

(51) Int. Cl.[7] ....................................................... F02N 3/00
(52) U.S. Cl. ..................................... 123/188.3; 29/888.45
(58) Field of Search ........................ 29/888.45, 888.451, 29/888.452, 888.453; 123/188.3

(56) References Cited

U.S. PATENT DOCUMENTS 2,411,734 * 11/1946 Kerwin et al. ..................... 123/188.3

FOREIGN PATENT DOCUMENTS

| 706 860 | | 6/1941 | (DE) . |
| 712 125 | | 10/1941 | (DE) . |
| 1 182 510 | * | 11/1964 | (DE) . |
| 40 24 084 | * | 6/1991 | (DE) . |
| 196 23 103 | * | 12/1997 | (DE) . |

OTHER PUBLICATIONS

Natriumgekühlte Hohlventile . . . by Herbert Stein, MTZ Motorrechnische Zeitschrift, Year 22, Issued Sep. 1961, Franckh'sche Verlagshandlung Stuttgart.

* cited by examiner

*Primary Examiner*—Noah P. Kamen
(74) *Attorney, Agent, or Firm*—Collard & Roe, P.C.

(57) ABSTRACT

The invention relates to a gas exchange valve with a hollow space, for an internal combustion engine. The valve comprises a valve stem (3), a valve base and a valve disk (2). The valve stem and valve disk or valve stem and valve base have an approximately cylindrical, elongated hollow space which is formed by both parts. The space is sealed by welding. The aim of the invention is to improve the quality of the welding. To this end, an extra mass of the material required for sealing the hollow space is provided on the valve disk or the valve base so that no additional welding material is necessary.

3 Claims, 1 Drawing Sheet

GAS EXCHANGE VALVE WITH A HOLLOW SPACE

CROSS REFERENCE TO RELATED APPLICATIONS

Applicants claim priority under 35 U.S.C. §119 of German Application No. 198 03 294.3 filed Jan. 29, 1998. Applicants also claim priority under 35 U.S.C. §120 of PCT/EP98/08342 filed Dec. 19, 1998. The international application under PCT article 21 (2) was not published in English.

BACKGROUND OF THE INVENTION

1. Field of the Invention

The invention relates to a gas exchange valve with a hollow space and to a process for producing such a valve.

2. The Prior Art

A valve of this type is known from DE-PS 40 24 084. In connection with this valve, the bore of the hollow gas exchange valve is closed by means of application welding in that an additional powdery material is applied, for example by laser welding, or in that am MIG-welding method or a WIG-welding method with an additional wire is employed.

It has been found that particularly when the bore is sealed by means of laser powder application welding, the quality requirements applicable to high-quality engine components can be satisfied only by carrying out costly tests.

SUMMARY OF THE INVENTION

The invention is therefore dealing with the problem of sealing the opening of the cavity formed by the shaft and the disk or the base of the valve in a valve of the type specified above in such a way that an optimal welded zone is obtained.

The invention is based on the idea that if the extra mass of material required on the disk or base of the valve for the purpose of sealing the opening or bore of the valve is remelted, a superior welding quality will be obtained than when additional material in the form of powder or wire is added. The respective additional mass of material or the additional material accumulation is shaped within the zone of the valve disk by forging; on the base of the valve, it suffices if said base is extended by a few millimeters.

It is in fact known from FIG. 11 of U.S. Pat. No. 2,411,734 to seal the bore of a gas exchange valve having a cavity without adding additional material. However, this is accomplished in this case by squeezing the walls of the bore together within the zone of the base of the valve, whereby extra mass is accordingly obtained radially.

BRIEF DESCRIPTION OF THE DRAWINGS

The invention is explained in greater detail in the following with the help of an exemplified embodiment. In the drawing.

DETAILED DESCRIPTION OF THE PREFERRED EMBODIMENT

Figure 1:
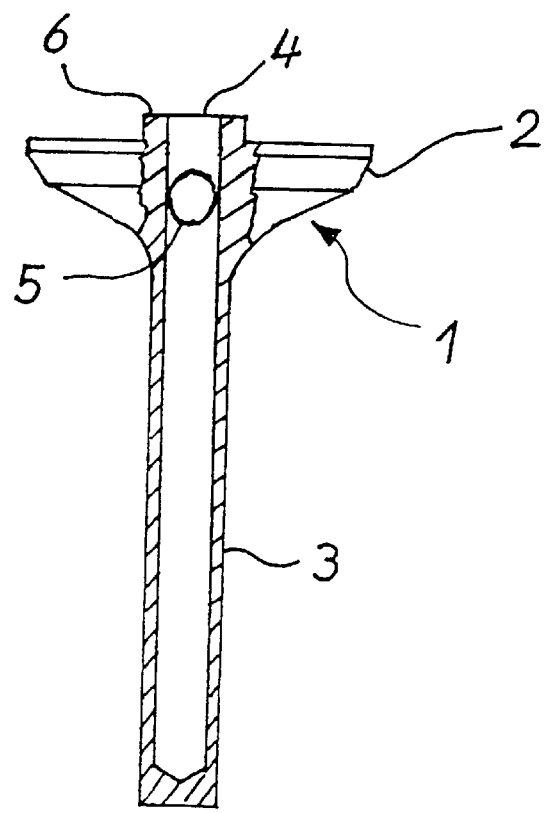
FIG. 1 shows a cross section through a valve as defined by the invention.
Figure 2:
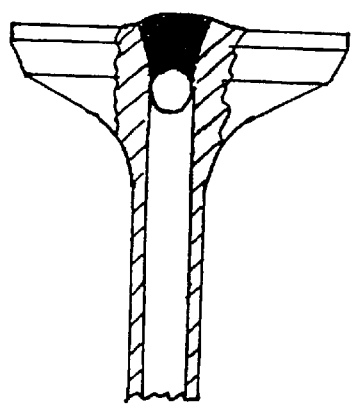
FIG. 2 shows the valve as defined by the invention after the opening has been welded shut.

The valve 1 has a valve disk 2 and in the valve stem 3 a bore 4 for receiving sodium. After the sodium has been filled in, the bore 4 is sealed by welding. Serving as a substrate for the welding bath, a fitting stopper 5 is pressed into the bore with a defined spacing from the top edge of the valve. A collar-like extra mass 6 is present at the upper end of the valve, said extra mass forming one single piece with the disk of the valve. Said extra mass is remelted as the borehole is being sealed, and flows into the bore up to the substrate of the welding bath. In the process of remelting and sealing of the opening, the vertically standing valve rotates around its axis, whereas the laser is guided two times across the collar-like extra mass and the opening by displacing it horizontally, starting radially on the outside. The laser may have in this connection a small setting angle of just a few degrees of angle in order to facilitate the flow of the melted material into the opening because of the blowing effect that is present in most cases.

So that the process can be carried out smoothly, the output of the laser should be in the order of magnitude of 5 kW.

It is basically possible also to carry out the remelting process with the axis of rotation of the valve in an inclined position, starting from the inner side of the bore.

The volume of the collar-like extra mass amounts to about 1.2 times the volume of the opening to be sealed. This applies to the sealing of a bore in the base of the valve accordingly.

So as to avoid overheating of the relatively lightweight valve during welding, the valve has to be chucked, if need be, in a cooled receptacle, or the receptacles have to be made of heat-dissipating copper.

What is claimed is:

1. A gas exchange valve for an internal combustion engine, comprising:

a valve stem having a valve base at one end; and a valve disk disposed on another end of said valve stem, wherein the valve stem and at least one of the valve base and valve disk have an approximately cylindrical, oblong hollow space with an approximately circular cross section, said space being formed by said valve stem and said at least one of said valve base and valve disk and having an opening with a cross section the same as the cross section of said hollow space, said opening to be closed on said at least one of said valve base and valve disk, wherein said opening is closed by material forming as a collar around the opening on said at least one of said valve disk and valve base, and wherein the only process for closing said opening consists of remelting the collar forming material so that it flows into and seals said opening.

2. The gas exchange valve according to claim 1, further comprising a fitted piece pressed into the oblong hollow space.

3. A method for producing a hollow gas exchange valve, comprising:

forming a valve having a valve stem, a valve base at one end of said stem and a valve disk at another end of said stem, and an oblong hollow space with an approximately circular cross section formed by said stem and one of said disk and said base, said space having an opening, and a volume of mass arranged around the opening like a collar; and sealing the opening only by remelting the mass.

* * * * *